Dec. 31, 1940.  W. E. SCHOBER  2,226,584

BRAKE CONTROL DEVICE

Filed Dec. 11, 1939

Inventor

Wayne E. Schober

By Carlsen & Hayle

Attorneys

Patented Dec. 31, 1940

2,226,584

UNITED STATES PATENT OFFICE 2,226,584

BRAKE CONTROL DEVICE

Wayne E. Schober, Minneapolis, Minn., assignor to Minneapolis-Moline Power Implement Company, Minneapolis, Minn., a corporation of Delaware Application December 11, 1939, Serial No. 308,651

4 Claims. (Cl. 188—3)

This invention relates to improvements in control devices for tractor trailer brakes.

Trailers of certain types now in use are provided with brakes which may be applied independently of the tractor brakes in order to prevent the trailer from surging forward when the tractor is stopped or is traveling down a sharp decline. Such brakes are usually operated either by air or electrically, and the well equipped tractor thus is provided with controls and connections for both kinds of brake systems. However, the controls have heretofore been entirely separate and the driver of the tractor, where it is used with a variety of trailers, must often pause to think which of the two types of brakes the particular trailer then in use may have, before he can apply the brakes. This frequently results in so-called "jack-knifing" before the brakes can be set and even in some circumstances the wrong brake control is operated and no brakes at all are applied to the trailer.

Having in mind the foregoing, it is the primary object of my invention to provide a means whereby the control elements of the respective trailer air and electric brake systems may be interconnected and actuated by a single hand lever so that, no matter which brake system may be in use, the operation of this lever will energize both systems and cause the setting of the brakes. Another object is to provide a control device of this kind of simple and effective form for convenient connection to the respective valve and switch controller units of the air and electric brake systems, without material or expensive alteration of these units.

These and other more detailed and specific objects will be disclosed in the course of the following specification, reference being had to the accompanying drawing, in which—

Figure 1:
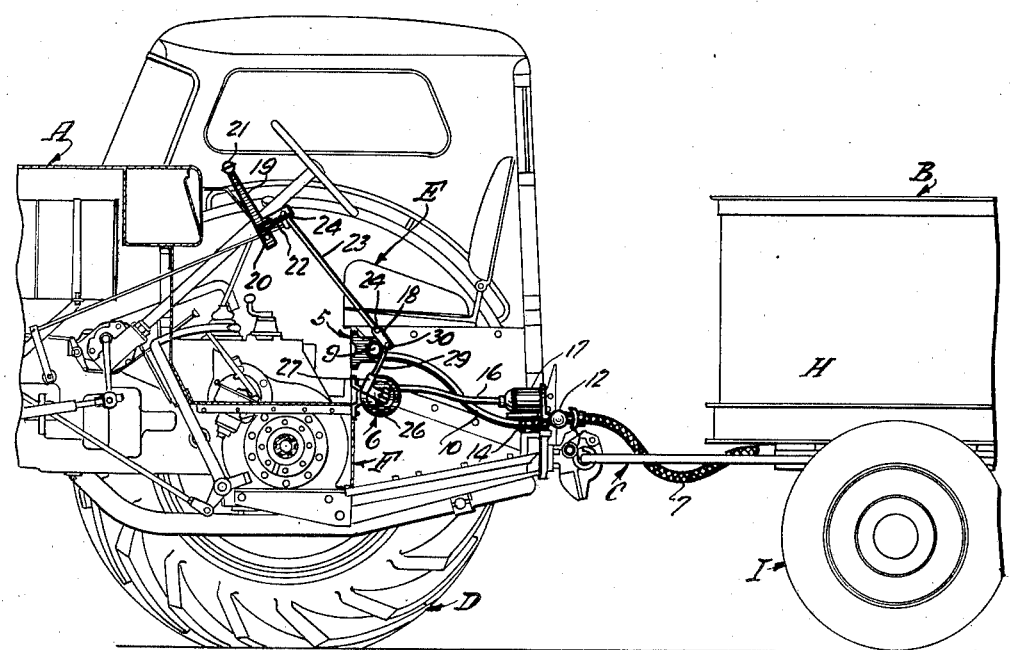
Fig. 1 is a side elevation, partially in vertical and longitudinal section, of the rear part of a tractor and forward part of a trailer, showing my improved brake control device on the tractor, the near traction wheel and fender of the tractor being removed.

Referring now with more particularity to the drawing, a rear portion of a conventional tractor is designated generally at A, and the forward portion of a trailer at B, with the hitch connection therebetween designated at C. It is understood that these units are shown as example only and that my invention may be applied as well to other forms of tractor and trailer vehicles.

The tractor A has the usual power unit and front wheels (not shown) and the rear traction wheels, only one of which is shown at D. The driver's seat E is supported upon a housing which includes a vertical supporting member or wall F and it is to this member that the air brake control valve 5 and electric brake control switch 6 are mounted. These elements are located immediately inside of the left rear wheel fender G. It is understood that the remainder of the brake system, including all energizing and supply connections to the control units 5 and 6, are conventional.

The trailer B has the body H and wheels I and in the illustrated instance is provided with air brakes thus having flexible air hoses 7 and 8 for service and emergency connections to the tractor adjacent the hitch C.

Figure 2:
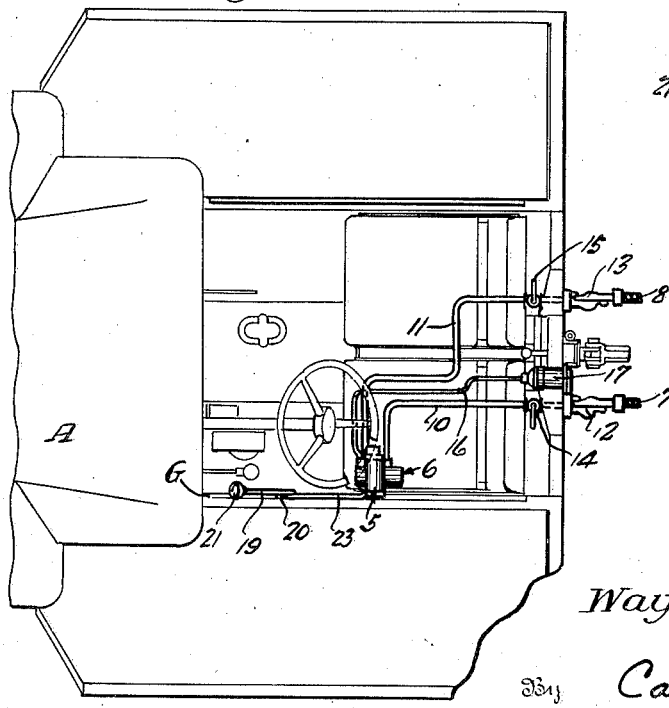
Fig. 2 is a fragmentary plan view of the tractor shown in Fig. 1, and with my brake control device thereon.

The air brake control unit or valve 5 is conventional and embodies as the control element a rotary member 9 which is ordinarily controlled by a suitable hand lever (not shown). From this valve are run separate pipe lines 10 and 11 rearwardly to conventional hose couplings 12 and 13 which are located at the rear of the tractor A for convenient connection to the trailer service and emergency air hoses 7 and 8 as best shown in Fig. 2. Shut-off valves 14 and 15 are located in the lines 10 and 11 forwardly of the couplings 12 and 13 so that the air supply to these couplings and to the trailer may be shut off at will.

The electric brake controller unit or switch 6 is also of conventional form, and the control wires 16 therefrom are led rearwardly to a conventional socket 17 to which connection may be made by the conventional plug (not shown) of an electric brake equipped trailer. This unit 6 is also controlled by its own handle in usual practice.

Figure 3:
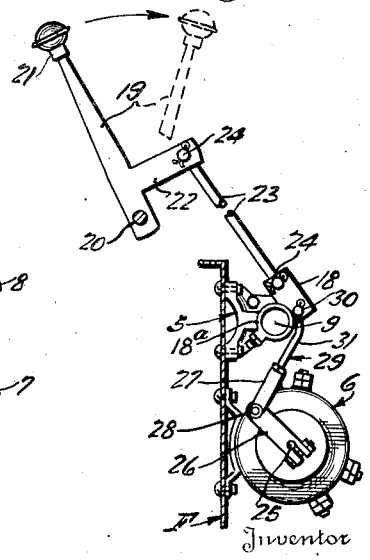
Fig. 3 is an enlarged side elevation of my control device and connected brake units, detached from the tractor.

In accordance with my invention the control unit 5 has rigidly mounted on its rotary member or stem 9 the operating member, bell crank or plate 18 best shown in Fig. 3. This plate 18 is a rigid part of the collar 18a secured to the valve stem. A hand lever 19 is pivotally attached at 20 to the upper inner side of the tractor fender G, or to another convenient part of the tractor, so that its upper hub-equipped end 21 is convenient to hand of the driver on the seat E. An arm or finger 22 is extended from the lower end portion of the hand lever 19 and an operating link 23 is pivotally connected at its ends 24 to this arm and to an upper end portion of the bell crank 18. The arrangement is thus such that movement of the lever 19 rearwardly in the direction of the arrow will oscillate the valve member 9 and open the valve 5 to charge the lines 10 and 11 and so actuate the trailer brakes.

The electric brake controller unit 6 includes a rotary control shaft 25 to which is rigidly secured a control lever 26. A fork 27 is pivotally connected at 28 to the end of this lever 26 and a rod or link 29 is secured to the fork and pivotally connected at 30 to a lower portion of the bell crank 18, the upper end of the rod being curved to clear the valve member 9 as shown at 31.

From the foregoing it will be seen that the aforesaid movement of the hand lever 19 rearwardly will, in addition to the operation of the valve 5, also oscillate the control lever 26 through the pushing action transmitted thereto by the bell crank 18, rod 29 and fork 27. The switch unit 6 will thus be operated to close a circuit back to the outlet or socket 17 and so charge the brakes of the trailer when these brakes are electrically operated and connected to said socket. In the assembly shown the respective control units 5 and 6 are necessarily oppositely rotated to move them to braking positions and the various connections are made to cause this reversal of the movement.

The driver of the tractor may thus manipulate the single hand lever 19 when he desires to apply the brakes to the trailer. Both control units will then be operated and either type of brakes used in the trailer will be applied or removed as the case may be. No harm results from operation of both control units, since when an air brake equipped trailer is not in use the valves 14 and 15 are closed when connecting the trailer and the lines 10 and 11 are simply charged with air back to these valves. On the other hand, the application of voltage to the socket 17 when air brakes are in use, of course will have no effect since no plug is inserted in the socket.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a tractor and trailer brake system, a trailer air brake control unit, a trailer electric brake control unit, operating members for said control units, a link connecting said operating members, a hand lever, and link means connecting said lever to one of the control units for actuating both control units.

2. In a tractor and trailer brake system, separate control units for both air and electric trailer brakes, the said units being mounted adjacent each other upon the tractor and having their operating shafts in parallelism, a crank member connected to one control unit, a crank arm on the other unit, a link connecting crank member to the crank arm of the other unit, a hand lever, and a connecting member between the hand lever and the said crank member for operating both control units.

3. In a tractor trailer brake system, separate control units for both air and electric trailer brakes, the said units being mounted one above the other on the tractor and having parallel rotary operating members, a bell crank member on the upper control unit, a crank arm on the lower unit, a link connecting a lower part of the bell crank member to the said crank arms for cooperatively actuating both control units to off and on positions, a hand lever on the tractor, and a member connecting said hand lever to an upper part of the bell crank member for actuating both control units.

4. In a tractor and trailer brake system wherein the tractor carries separate control units for both fluid and electric trailer brakes and with separate outlets for selective connection to the trailer according to the type of brakes used thereon, a common operating means for simultaneously operating both control units and thereby ensuring that the trailer brakes will be energized whether they may be of the fluid or electrically operated types, the said means comprising operating members connected to the control units, a link connecting the said operating members, a single hand lever, a connecting member between the hand lever and one of the said operating members, and means for shutting off the fluid brake outlet when not in use.

WAYNE E. SCHOBER.